United States Patent
Dwivedi et al.

(10) Patent No.: US 12,045,666 B2
(45) Date of Patent: Jul. 23, 2024

(54) PROFILING AND PERFORMANCE MONITORING OF DISTRIBUTED COMPUTATIONAL PIPELINES

(71) Applicant: NVIDIA Corporation, Santa Clara, CA (US)

(72) Inventors: Shekhar Dwivedi, Santa Clara, CA (US); Rahul Choudhury, Livermore, CA (US)

(73) Assignee: Nvidia Corporation, Santa Clara, CA (US)

( * ) Notice: Subject to any disclaimer, the term of this patent is extended or adjusted under 35 U.S.C. 154(b) by 125 days.

(21) Appl. No.: 17/249,194

(22) Filed: Feb. 23, 2021

(65) Prior Publication Data

US 2022/0269548 A1    Aug. 25, 2022

(51) Int. Cl.
   *G06F 9/50*      (2006.01)
   *G06F 11/30*     (2006.01)
   *G06F 11/34*     (2006.01)
   *G06F 16/901*    (2019.01)

(52) U.S. Cl.
CPC ........ *G06F 9/5083* (2013.01); *G06F 11/3006* (2013.01); *G06F 11/3409* (2013.01); *G06F 16/9024* (2019.01)

(58) Field of Classification Search
CPC .... G06F 9/5083; G06F 9/547; G06F 11/3006; G06F 11/3409; G06F 16/9024
See application file for complete search history.

(56) References Cited

U.S. PATENT DOCUMENTS

| | | | |
|---|---|---|---|
| 2012/0185864 A1* | 7/2012 | Toukmaji | G06F 11/3636 |
| | | | 718/104 |
| 2017/0255496 A1* | 9/2017 | Deng | G06F 9/5027 |
| 2020/0057675 A1* | 2/2020 | Dias | G06F 9/5061 |
| 2020/0327036 A1* | 10/2020 | Zhao | G06F 11/3065 |
| 2021/0152659 A1* | 5/2021 | Cai | H04L 41/0813 |

\* cited by examiner

*Primary Examiner* — Sisley N Kim
(74) *Attorney, Agent, or Firm* — Lowenstein Sandler LLP

(57) ABSTRACT

Apparatuses, systems, and techniques to collect performance data for one or more computations tasks executed by a plurality of nodes of a computational pipeline and enable optimization of distribution of task execution among the plurality of nodes.

22 Claims, 12 Drawing Sheets

PROFILING AND PERFORMANCE MONITORING OF DISTRIBUTED COMPUTATIONAL PIPELINES

TECHNICAL FIELD

At least one embodiment pertains to processing resources used to perform and facilitate performance monitoring of distributed computational pipelines. For example, at least one embodiment pertains to collecting performance data for one or more computational tasks executed by a plurality of nodes of a computational pipeline, and enabling optimization of task distribution among the plurality of nodes.

BACKGROUND

Computational pipelines involve distributions of computational tasks among multiple nodes (computing devices) with various nodes executing one or more computational sub-tasks. Data input into a particular node may be output data generated by a previous node as part of a computational sub-task assigned to the previous node. Various nodes may include different processing and memory devices and may specialize in different types of computational sub-tasks. Some nodes may be capable of efficient serial processing while some nodes may more efficiently perform graphics processing, and so on. Data may be transferred between different nodes via networks.

DETAILED DESCRIPTION

Figure 1A:
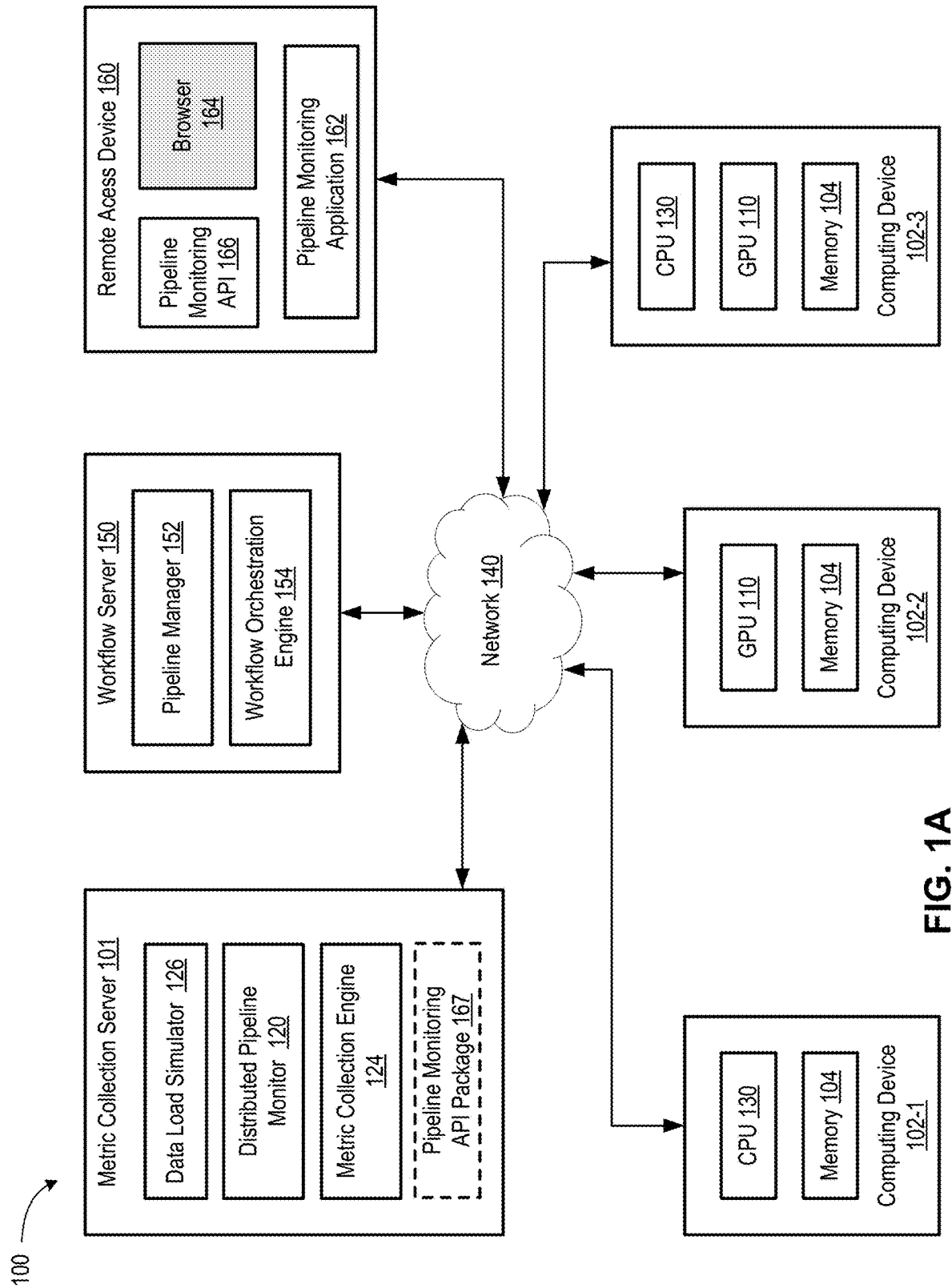
FIG. 1A is a block diagram of an example system that supports profiling and performance monitoring of distributed computational pipelines, in accordance with at least some embodiments.

Computational pipelines that distribute sub-tasks among multiple nodes enable scaled execution of computational tasks with dedicated nodes performing assigned functions. Such specialization of distributed computing systems result in an efficient utilization of hardware and software resources. Computationally-intensive applications may include image and video processing, medical imaging, simulation and rendering, object recognition, and so on. In at least one embodiment, applications may use machine learning algorithms (including use of one or more neural network models). A pipeline may sometimes be represented in the form of a graph that has nodes connected by edges, with nodes indicating computational sub-tasks and edges corresponding to a flow (e.g., order) of execution and direction of data flows between nodes. In at least one embodiment, a graph may be a directed acyclic graph (DAG) in which data flows along directed edges and no sequence of directed edges loops back to the earlier nodes in the graph. One or more sub-tasks assigned to a given node may be executed using computational resources of a separate computing device (e.g., server) or multiple computing devices. In at least one embodiment, multiple nodes may be executed on different resources of the same computing device. Depending on a sub-task being assigned to a particular node, the sub-task may be executed on one or more CPUs (e.g., for serial or heavy computational processing), one or more GPUs (for parallel, e.g., graphics, processing), or a combination of CPU(s) and GPU(s). In some instances, CPU and/or GPU may be physical processing units (physical CPU and/or physical GPU). In some implementations, CPU and/or GPU may be virtual CPU (vCPU) and/or virtual GPU (vGPU) supported by physical processing units, with each physical CPU and/or GPU supporting operations of multiple vCPUs and/or vGPUs. In some instances a physical processing device of a particular type (e.g., a physical CPU) may support operation of virtual processing devices of multiple types. For example a single physical CPU (or physical GPU) may support a one or more vCPUs and one or more vGPUs. A reference throughout this disclosure to a CPU and/or GPU should be understood to apply to both physical or virtual respective processing units.

Efficiency of the pipeline execution depends on the optimal allocation of resources, e.g., on optimal distribution of sub-tasks among nodes. A number of problems and challenges may be encountered in optimization of a pipeline execution. For example, tasks that are assigned to CPU(s) may be more efficiently executed on GPU(s). Similarly, a task assigned to and executed on a CPU or GPU may not be utilizing the respective processing devices efficiently, and so on. In many such or similar instances, it may be difficult for a developer to identify these inefficiencies. In some instances, a bottleneck can be formed when too many sub-tasks are scheduled for CPU execution while GPU resources are idling (or vice versa). In some instances, application developers may use toolkits (which may include multiple sequences of pre-packaged processor operations or routines) that interact with CPU(s) and/or GPU(s) in a way that may be unknown to the developer (or at least partially obscured). As a result, the developer's efforts to optimize application execution may be limited by the architecture of the toolkits. Without detailed processor performance metrics, a developer may not be able to maximize efficiency of the pipeline execution. In some instances, multiple tasks (each corresponding to a different pipeline) may be executed concurrently on the same shared distributed computing resources (e.g., processing, memory, network resources, etc.). Optimization of such a concurrent execution may be enabled by tracking how various tasks interact with each other. For example, if it is known that a first task has a peak computational demand at a first time and a second task has a peak demand at a second, different time, the two tasks may be scheduled in a staggered fashion where the respective peak times do not overlap (or minimally overlap) with each other.

Existing methods and approaches are limited to monitoring individual physical nodes, where a node's main memory usage, GPU memory usage, CPU/GPU utilization, network bandwidth utilization, network traffic data, input/output (I/O) traffic data, and the like, are measured. However, existing systems and methods do not provide functionality to monitor execution of tasks of distributed pipelines performed on multiple physical nodes. Moreover, existing GPU performance analyzers are limited to providing post-processing analyses and lack real-time monitoring functionality. Furthermore, available GPU performance analyzers are designed for developers familiar with GPU architecture and are less useful for application developers in such fields as machine learning, computer vision, etc., whose knowledge of hardware may be more limited.

Aspects of the present disclosure address these and other challenges of the modern technology by providing methods and systems that enable profiling and monitoring of computational pipeline execution on a distributed system of computational resources. Disclosed implementations enable collecting information about one or more pipelines/tasks (e.g., a DAG of each pipeline) that are being executed (or about to be executed), querying hardware resources of various (e.g., remote) computing devices that may execute different sub-tasks, and providing the collected information in a format that is representative of the utilization of computing resources, and is also understandable to an application developer who may not be a hardware specialist. In at least one embodiment, the collected information may be provided in a real-time format and may further be accessible from a remote device via a browser (or another downloadable application) via a special application programming interface (API). In at least one embodiment, collected information may be representative of performance of computational resources at multiple hierarchical levels, including but not limited to system level (multiple tasks), single task level, sub-task level, and kernel level.

System Architecture

FIG. 1A is a block diagram of an example system 100 that supports profiling and performance monitoring of distributed computational pipelines, in accordance with at least some embodiments. As depicted in FIG. 1A, a computing system 100 can include a metric collection server 101, multiple computing devices 102, a workflow server 150, and a remote access device 160 connected to a network 140. Network 140 may be a public network (e.g., the Internet), a private network (e.g., a local area network (LAN), a wide area network (WAN), etc.), a wireless network, a personal area network (PAN), or a combination thereof.

Metric collection server 101 may be a desktop computer, a laptop computer, a smartphone, a tablet computer, a server, a computing device that accesses a remote server, a computing device that utilizes a virtualized computing environment, a computing device that uses any number of CPUs and GPUs, including vCPUs and/or vGPUs, or any other suitable computing device capable of performing the techniques described herein. Computing devices 102 may similarly be any devices (e.g., servers, server farms, desktop computers, edge devices, and so on) having processing capability to execute at least one sub-task of a computational task that is being performed and monitored by system 100. Computing devices 102 may include devices (e.g., computing device 102-1) that have one or more CPUs (e.g., CPU 130), devices (e.g., computing device 102-2) that have one or more GPUs (e.g., GPU 110), and/or devices that have combinations of one or more CPUs and one or more GPUs (e.g., computing device 102-3). Each of CPUs 130 and/or GPUs 110 may have access to one or more memory devices 104 located on the same computing device as well as memory devices located on other machines, including memory devices not explicitly shown in FIG. 1A. Although three computing devices 102 are shown in FIG. 1A for illustration, any number of computing devices may be used for a pipeline execution. In at least one embodiment, multiple computational tasks may be executed by system 100, each task associated with its own specific pipeline that deploys a different (though possibly partially overlapping) set of computing devices 102. Each computing device 102 may execute a node (multiple nodes) of a pipeline (of multiple pipelines). In some instances, a single node of a pipeline may be executed by multiple computing devices 102 that exchange data.

Metric collection server 101 may include a distributed pipeline monitor 120 configured to provide information (e.g., to a user, such as a pipeline developer) about a state of execution of a task (an instance of a pipeline), including real-time information. Distributed pipeline monitor 120 may be configured to perform both profiling and monitoring of pipeline execution. Pipeline profiling may include collecting data regarding how various sub-tasks of a task associated with a given pipeline are distributed among various computing devices, what specific resources the distributed sub-tasks are using, how data transfer between various computing devices occurs, and so on. In at least one embodiment, pipeline profiling may be performed statically, prior to execution of a pipeline task (or multiple tasks of the same pipeline) or after the task has been executed. Monitoring of pipeline execution may include collecting actual (e.g., real-time data) about how various distributed tasks (belonging to one or more pipelines) are being executed, about current levels of utilization of various hardware resources, ongoing interactions between the hardware resources (and between different tasks/pipelines), and the like. Monitoring of pipeline execution may further include registration of a particular resource (e.g., a physical and/or virtual CPU and/or GPU) for time domain tracking and observing the resource utilization in real time.

Distributed pipeline monitor 120 may be configured to provide information (1) at the level of the whole system 100 that executes (e.g., sequentially or in parallel) multiple tasks with performance of various tasks being monitored, (2) at the level of a specific task, with performance of multiple sub-tasks being monitored, (3) at the level of a sub-task, with hardware resources (CPUs, GPUs, memory, network bandwidth) being monitored, and (4) at the kernel level, e.g., with various processor (e.g., GPU/CPU) threads being monitored. Metric collection server 101 may further include metric collection engine 124 configured to collect performance metrics from some or each of computing devices 102 used for pipeline execution. Metric collection engine 124 may poll various computing devices of system 100 and collect a number of metrics characterizing performance of hardware resources, including but not limited to CPU computational activity, CPU read/write operations, GPU computational activity, GPU memory occupation, GPU read/write memory operations (e.g., per unit of time), a current and an average (over some time horizon) network bandwidth, throughput, latency, packet loss, CPU/GPU temperature, CPU/GPU performance state (e.g., in some discretized units), CPU/GPU utilization level (e.g., in percentages or some other units), power usage, and so on. In obtaining performance metrics from computing devices 102, metric collection engine 124 may utilize existing and already installed (on respective computing devices) metrology tools. Collected data may relate to different processing and memory devices, network controllers, I/O controllers, etc., and may have device-specific (including proprietary) formats that are different from each other. Metric collection engine 124 may perform standardization of the collected data to a uniform format used by distributed pipeline monitor 120. In at least one embodiment, translation of multiple formats of collected data and communication of translated data to distributed pipeline monitor 120 may be facilitated by a pipeline monitoring API (not shown in FIG. 1A).

Metric collection server 101 may further include a data load simulator 126 that may be used to simulate, e.g., for the purpose of testing and optimization, performance of one or more distributed pipelines on system 100 under various loads and conditions, such as execution of various sub-tasks on different nodes. For example, at a sub-task level, data load simulator 126 may be able to test performance of a particular node (e.g., one of computing devices 102) by causing the node to process specific testing data prepared to evaluate performance of the node under realistic conditions. In at least one embodiment, data load simulator 126 may perform testing and simulations during a downtime of system 100. In at least one embodiment, data load simulator 126 may perform testing and simulations concurrently with execution of actual tasks by system 100. Results of such testing may indicate how various tasks executed on system 100 are likely to interact with each other and provide valuable data relevant for multi-task optimization. In at least one embodiment, data load simulator 126 may perform testing and simulations at a task level, e.g., by preparing and feeding (inputting) simulated datasets into a specific pipeline. Likewise, data load simulator 126 may perform testing and simulations at the system level, e.g., by preparing and feeding multiple datasets into a specific pipeline to create multiple tasks and/or by preparing datasets that simulate various tasks that are instances of different pipelines.

System 100 may include a workflow server 150 that may be a separate computing device, or a part of another computing device such as metric collection server 101, or one of computing devices 102. Workflow server 150 may be used to set up and configure execution of various pipelines and may further be used to control data flows and direct ongoing execution of sub-tasks and other components of pipelines. Workflow server 150 may include pipeline manager 152 and a workflow orchestration engine 152. Pipeline manager 152 may be configured to set up (in at least one embodiment, with an input from a developer) a pipeline architecture, including identifying nature and number of sub-tasks, a sequence of sub-task execution, directions of data flows between nodes corresponding to sub-tasks, system (CPU/GPU/memory/network) requirements for various sub-tasks, target execution times for various sub-tasks/processes, and other computational requirements for successful pipeline execution.

Workflow orchestration engine 154 may identify, based on pipeline configuration determined by pipeline manager 152, how the pipeline tasks are to be executed on available computing devices and other hardware resources of system 100. For example, based on the number of nodes/sub-tasks identified (by pipeline manager 152) to be performed by a specific pipeline, workflow orchestration engine 154 may determine what specific computing devices 102 are to be used for various nodes. In identifying what hardware resources to utilize in pipeline execution, workflow orchestration engine 154 may match network requirements identified by pipeline manager 152 to network resources of system 100 (e.g., based on the types and amount of data flows that are to occur between various nodes). Additionally, workflow orchestration engine 154 may maintain an execution schedule of one or more pipelines on various computing devices of system 100, manage performance and rerouting of task and sub-task execution in instances of some computing devices experiencing outages, and perform other task execution-related functions.

Metric collection engine 124 may access workflow orchestration engine 154 to obtain descriptions of pipeline nodes and edges (e.g. DAGs of various pipelines). Based on the obtained descriptions, distributed pipeline monitor 120 may create representations (e.g., visual images) of the pipelines and provide the created representations to a user (e.g., a developer).

In at least one embodiment, the user may be provided a direct access to metric collection server 101, which may be a workstation hosting a distributed pipeline monitor 120. In at least one embodiment, distributed pipeline monitor 120 may be accessed from a remote access device 160 over network 140. Remote access device 160 may host a pipeline monitoring application 162 that may be communicating with metric collection engine 124. Pipeline monitoring application 162 may provide various metrics associated with performance of different tasks, sub-tasks, modules, kernels, and so on, used to run one or more instances of various pipelines. The metrics may be displayed on a browser window of a browser 164 (or some other application, e.g., a mobile application) that interacts with remote pipeline monitoring application 162 via a pipeline monitoring API 166. In at least one embodiment, metric collection server 101 may store a pipeline monitoring API package 167 that includes executable codes, libraries, and other data downloadable by one or more additional remote access devices. For example, a remote access device may retrieve pipeline monitoring API package 167 from metric collection server 101 and install the pipeline monitoring API from the retrieved package. The installed API makes pipeline profiling/monitoring data available to a user, allows using built-in plug-ins (and developing additional custom plug-ins) for tracing profiling/monitoring data to various hardware devices (and routines, modules, and functions executed thereon) as well as facilitates statistical analysis and visualization of profiling/monitoring data.

Figure 1B:
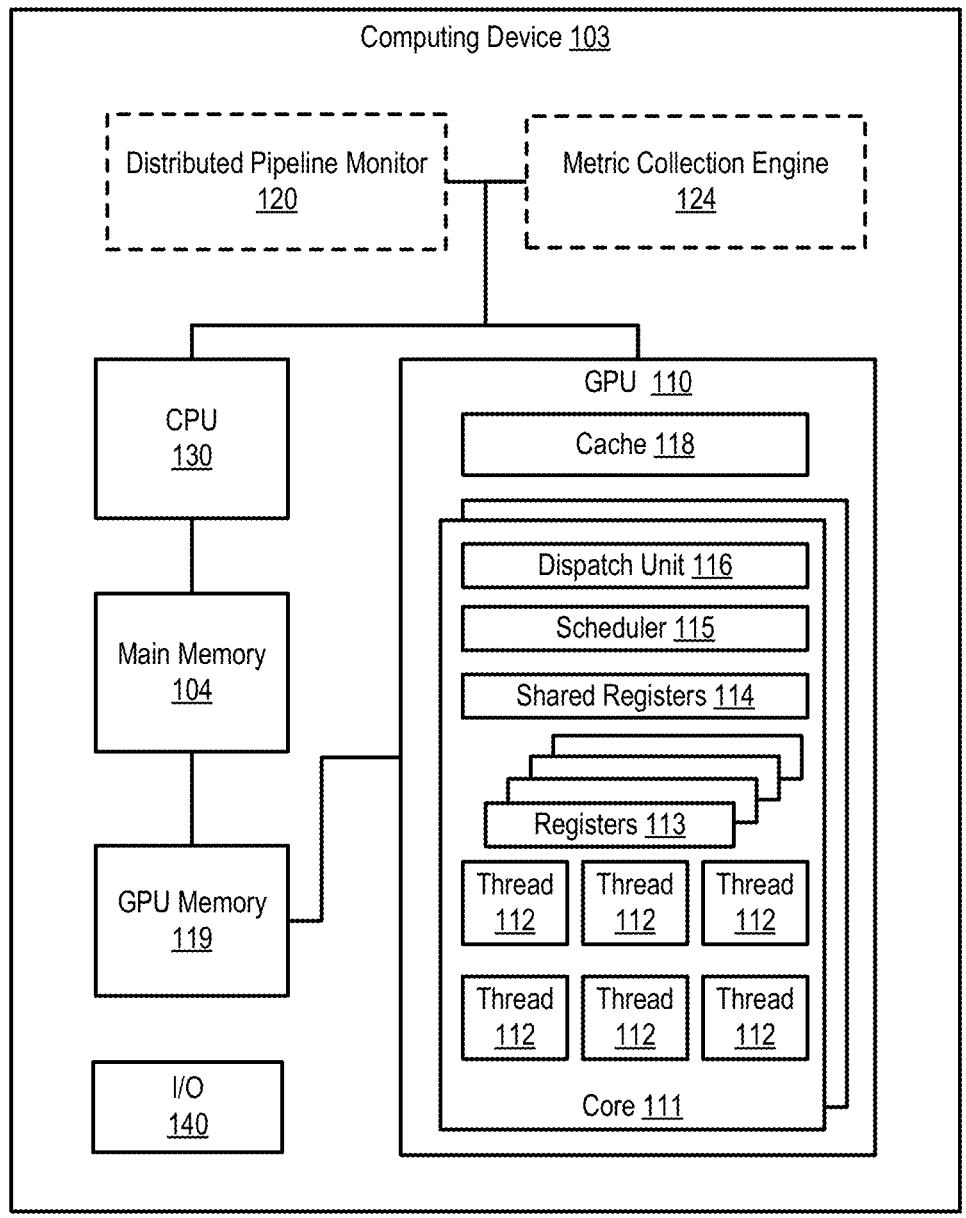
FIG. 1B is an example computing device that can be used in profiling and performance monitoring of distributed computational pipelines, in accordance with at least some embodiments.

FIG. 1B is an example computing device 103 that can be used in profiling and performance monitoring of distributed computational pipelines, in accordance with at least some embodiments. In at least one embodiment, computing device 103 may be one of computing devices 102 that execute one or more sub-tasks of distributed pipelines. In at least one embodiment, computing device 103 may be metric collection server 101 and may host (as depicted with respective dashed boxes) distributed pipeline monitor 120 and metric collection engine 124. In at least one embodiment, computing device 103 may serve as metric collection server 101, and also perform a function of a computing device 102, e.g., by executing one or more subtasks of distributed pipelines using one or more GPUs 110 and/or CPUs 130. In at least one embodiment, GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Shared registers 114 may be accessed by multiple (e.g., all) threads of the core. In at least one embodiment, each core 111 may include a scheduler 115 to distribute computational tasks and processes among different threads 112 of core 111. A dispatch unit 116 may implement scheduled tasks and sub-tasks on appropriate threads using private registers 113 and shared registers 114. Computing device 103 may include input/output component(s) 140 to facilitate exchange of information with one or more users or developers.

In at least one embodiment, GPU 110 may have a (high-speed) cache 118, access to which may be shared by multiple cores 111. Furthermore, computing device 103 may include a GPU memory 119 where GPU 110 may store intermediate and/or final results (output) of computations performed by GPU 110. After completion of a particular task, GPU 110 (or CPU 130) may move the output to (main) memory 104. Referring to both FIG. 1A and FIG. 1B, in at least one embodiment, workflow orchestration engine 154 may assign, for execution, to CPU 130 one or more sub-tasks that involve serial computations and to GPU 110 one or more sub-tasks (such as neural network computations) that are amenable to parallel processing. In at least one embodiment, workflow orchestration engine 154 may assign one or more sub-tasks to computing device 103 without specifying how the assigned sub-tasks are to be performed by resources of computing device 103. Respectively, a processing device (e.g., CPU 130) of computing device 103 may distribute various parts of the assigned sub-tasks for execution on GPU 110 and CPU 130.

Figure 2:
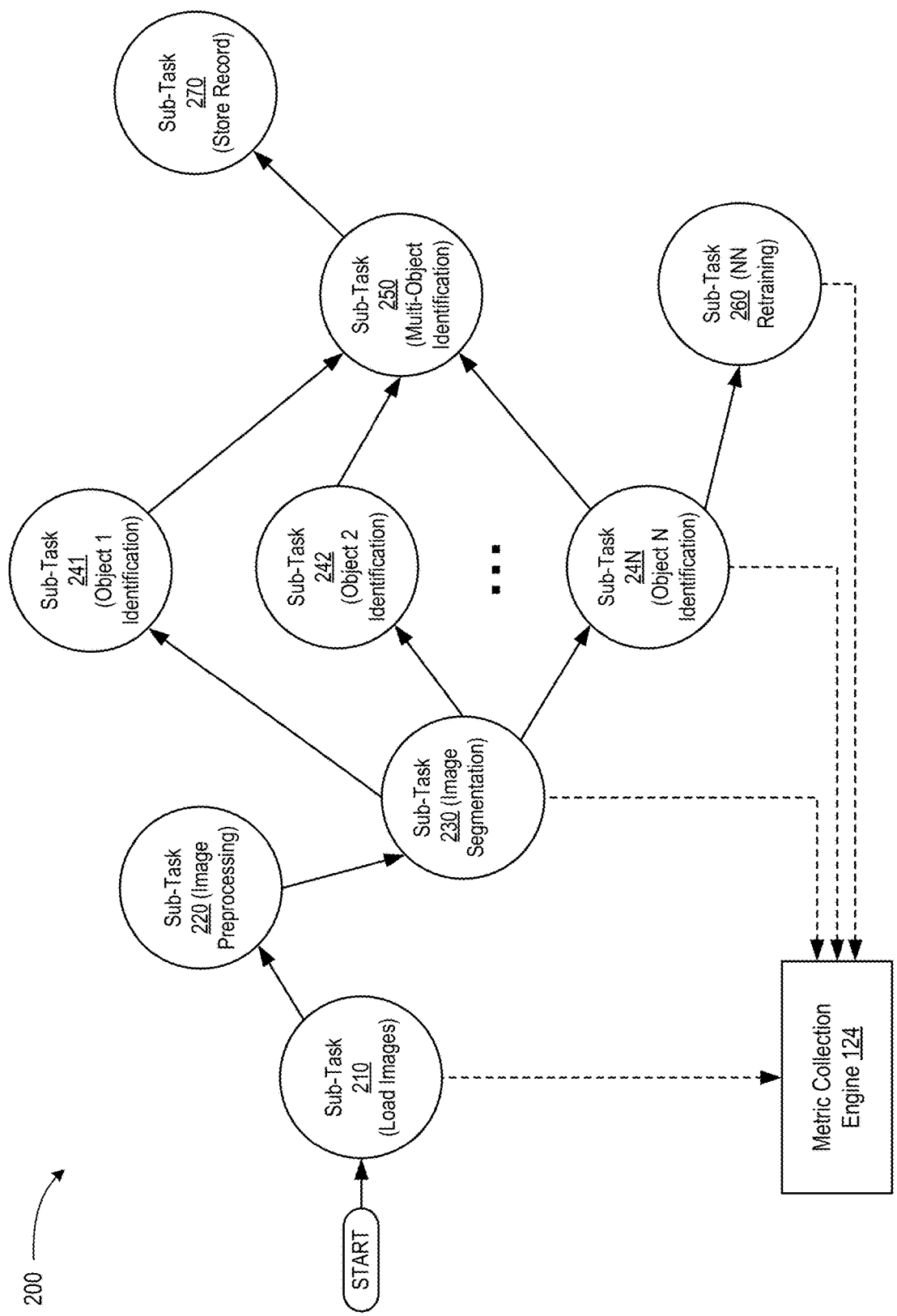
FIG. 2 illustrates an example distributed pipeline deploying a plurality of computational resources whose performance is monitored by a metrics collection engine, according to at least one embodiment.

FIG. 2 illustrates an example distributed pipeline 200 deploying a plurality of computational resources whose performance is monitored by a metrics collection engine, according to at least one embodiment. Shown in FIG. 2 is a graph (DAG) in which data is flowing (as indicated by solid arrows) in substantially a directed fashion (from left to right) although multiple sub-tasks may be executed in parallel. A single execution instance of pipeline 200 is referred to herein as a task. Multiple tasks belonging to the same pipeline 200 may be executed concurrently (and may be at different stages of execution at any particular instance of time). Similarly, tasks belonging to multiple pipelines (e.g., other than pipeline 200) may be executed concurrently on the same system (e.g., system 100). An execution of a task of pipeline 200 may include execution of a number of sub-tasks 210-270 each depicted with a circle corresponding to a node of the DAG. In at least one embodiment, each sub-task may be executed by a different computing device 102. In at least one embodiment, some sub-tasks may involve multiple computing devices 102. In at least one embodiment, some computing devices 102 may execute multiple sub-tasks.

Shown in FIG. 2, for the sake of illustration, is a distributed pipeline performing object identification in the context of computer vision. Sub-task 210 may involve loading (which may include obtaining or generating) one or more images. Sub-task 220 may include preprocessing of the loaded images, e.g., image trimming, sharpening, blur/artifact removal, compression, resampling, normalizing, and so on. Sub-task 230 may include segmentation of loaded images, e.g., into regions of interest. For example, in autonomous driving applications, regions of interest may include portions of loaded images that are likely to include moving vehicles, pedestrians, road signs, obstacles, and so on. A set of subtasks 241, 242 . . . 24N may include identifications of objects within the regions of interest. In at least one embodiment, some or all of sub-tasks 230, 241 . . . 24N may include application of neural networks (NN) to input data. Sub-task 250 may involve performing a multi-object determination based on the identified individual objects, e.g., determination of a driving situation in the environment of an autonomous vehicle. Sub-task 260 may include retraining one of the neural networks, e.g., responsive to encountering an unknown type of an object. Sub-task 270 may include storing a record of the determined driving environment (archiving the record, transmitting the record over a network, etc.). As depicted with dashed arrows, metric collection engine 124 may collect performance metrics from some or each of computing devices that execute various sub-tasks of distributed pipeline 200.

Figure 3:
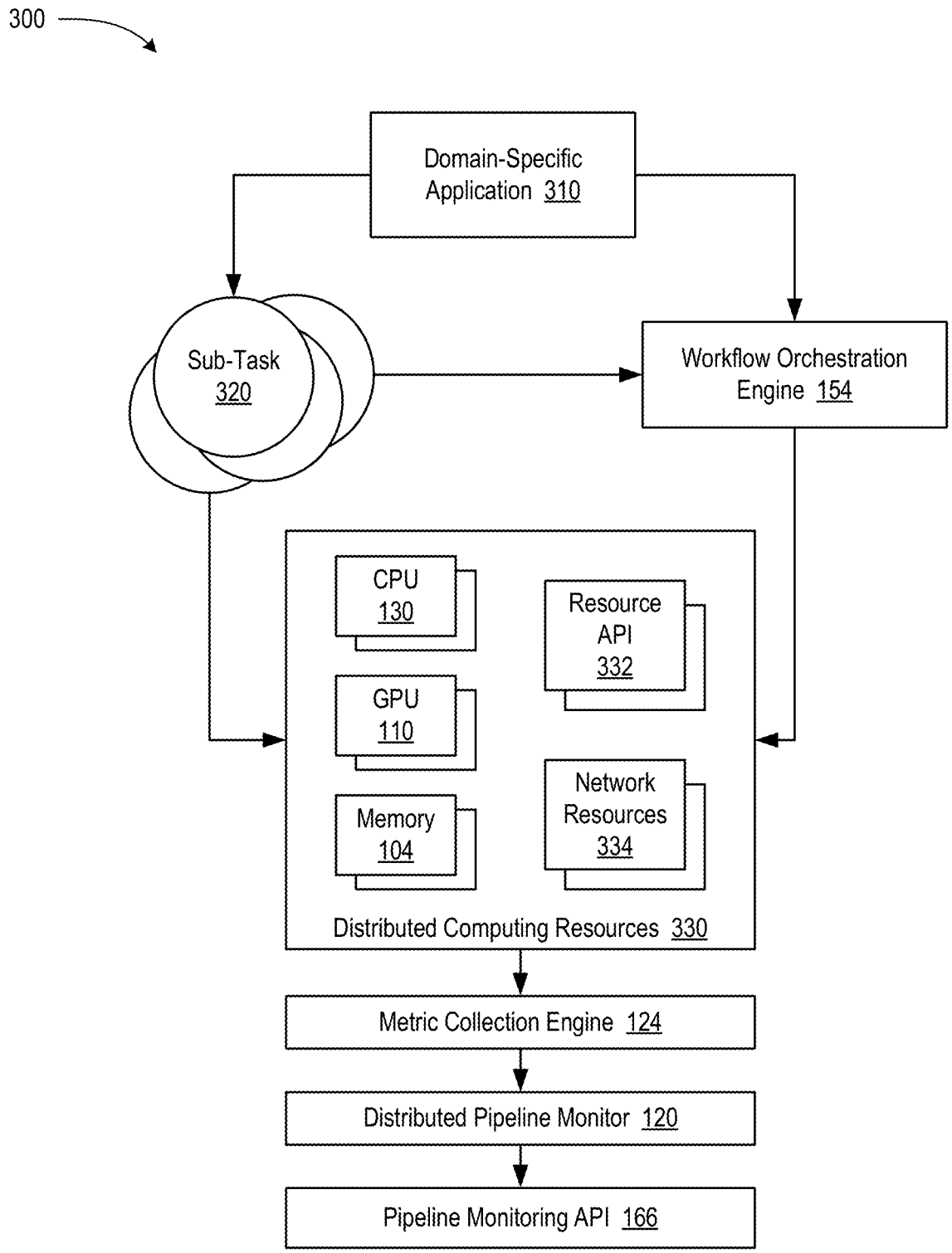
FIG. 3 illustrates an example architecture that may be used for profiling and performance monitoring of computational resources deployed by a distributed pipeline, according to at least one embodiment.

FIG. 3 illustrates an example architecture 300 that may be used for profiling and performance monitoring of computational resources deployed by a distributed pipeline, according to at least one embodiment. Example architecture 300 may include a domain-specific application 310 (e.g., a medical imaging application, a driving application, a shipping facility application, etc.), which may be hosted by any of the devices or servers of system 100. Domain-specific application 310 may be any software component or a collection of components that specify a plurality of computational sub-tasks 320 to solve a domain-specific problem, e.g., to perform image processing, object recognition, execute an industrial equipment control, robotics operations, implement autonomous driving algorithms, and so on. Application 310 may generate a listing of sub-tasks 320 that may be provided to workflow orchestration engine 152, which manages computational resources, I/O data payloads, scheduling and prioritization of execution of sub-tasks 320, and so on. Workflow orchestration engine 154 may schedule various sub-tasks 320 using distributed computing resources 330, which may be located on any number of computing devices (e.g., computing devices 102 of FIG. 1A). Distributed computing resources 330 may include—across various computing devices—one or more GPUs 110, one or more CPUs 130, memory devices 104, various network resources, I/O devices, controllers, peripheral devices, such as medical imaging equipment, cameras, printers, scanners, etc., and/or any other devices. Communication with various resources may be facilitated by respective resource APIs 332.

Resource APIs 332 may further enable collection of performance metrics (such as various GPU/CPU/memory/network/input-output/etc., metrics) for various distributed computing resources 330. Metric collection engine 124 may interact with respective resource APIs 332 to collect performance metrics of various computing resources. Because different computing resources may be designed and manufactured by different vendors, and have different operating systems, drivers, plug-ins, and the like, collected performance metrics may be in a variety of different formats. Metric collection engine 124 may convert data (e.g., performance metrics) of individual computing resources received from each of distributed computing resources 330 into a format accessible to distributed pipeline monitor 120. Pipeline monitoring API 166 may then enable interaction of various remote devices with distributed pipeline monitor 120.

Figure 4:
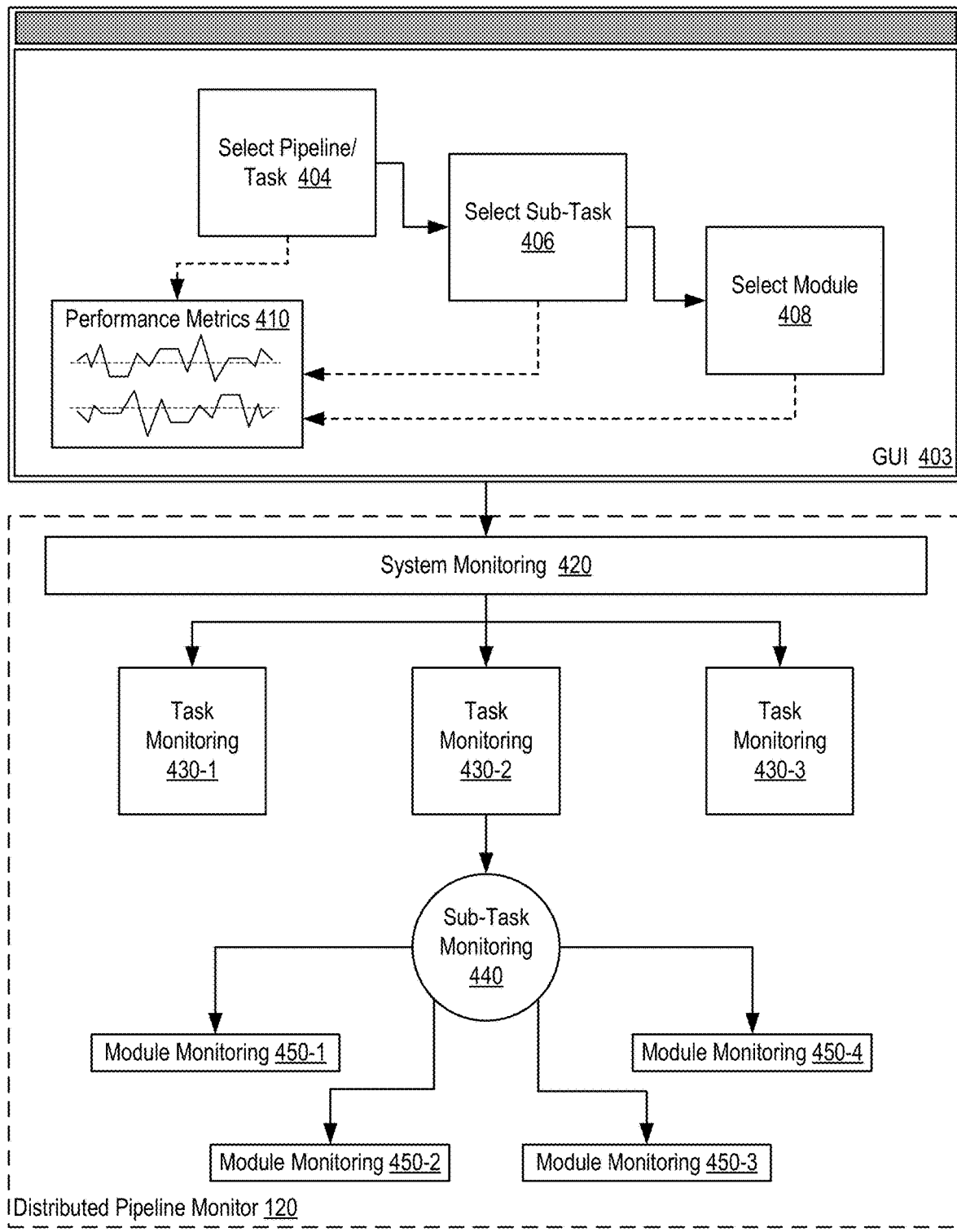
FIG. 4 is an example illustration of a hierarchical pipeline monitoring of a system that provides distributed computing resources for task execution, according to at least one embodiment.

FIG. 4 is an example illustration of a hierarchical pipeline monitoring 400 of a system that provides distributed computing resources for task execution, according to at least one embodiment. Shown schematically is a graphical user interface (GUI) 403 of a pipeline monitoring application 162 of FIG. 1A. In at least one embodiment, pipeline monitoring application 162 may be combined with distributed pipeline monitor 120 and hosted by metric collection server 101. In at least one embodiment, pipeline monitoring application 162 may be hosted by a remote access device 160 and may be communicating with distributed pipeline monitor 120 (hosted by metric collection server 101) via network 140. Pipeline monitoring application 162 (or distributed pipeline monitor 120) may provide a graphical user interface (GUI) 403 to a user (e.g., a pipeline developer or administrator). In at least one embodiment, GUI 403 may allow the user to request execution of one or more tasks belonging to one or more distributed pipelines. Task execution may be initiated by a domain-specific application 310 (depicted in FIG. 3) that may be hosted by a different server or computing device than a device that hosts pipeline monitoring application 162. In at least one embodiment, pipeline monitoring application 162 may provide, via GUI 403, representations of various pipelines configured to be executed on distributed computing resources 330. In at least one embodiment, the user may first register (e.g., via GUI 403) a specific pipeline of interest with pipeline monitoring application 162, e.g., by browsing a listing of previously registered (with pipeline monitoring application 162) pipelines, searching among pipelines that are managed by pipeline manager 152, and so on. After a pipeline is registered, pipeline monitoring application 162 may obtain, from pipeline manager 152, information about the pipeline architecture (e.g., the number of sub-tasks, type and directions of data flows in the pipeline, and so on). Pipeline monitoring application 162 may provide (for presentation on GUI 403) the obtained information using a graphical representation, which may include graphs (e.g., DAGs) or other graphical depictions (trees, hierarchies, thumbnails, lists, etc.) of the pipelines. Pipeline monitoring application 162 may further obtain, from workflow orchestration engine 152, an information about distribution of various sub-tasks among computing devices and hardware resources of such devices. Pipeline monitoring application 162 may provide (for presentation on GUI 403) the obtained information using a graphical representation, which may include graphs (e.g., DAGs) or other graphical depictions (trees, hierarchies, thumbnails, lists, etc.) of the pipelines. In at least one embodiment, pipeline monitoring application 162 may further provide (for presentation on GUI 403) listings of various tasks (instances of respective pipelines) currently executed on distributed computing resources 330. The listings of tasks may indicate a starting time of the respective task, a current stage of the task execution, specific computing resources used for the task execution, priority of the task, task owner, and the like.

In at least one embodiment, upon registration of a pipeline, distributed pipeline monitor 120 may instantiate a monitoring session that organizes and handles data related to a specific monitoring episode (e.g., a task or a collection of tasks of one or more pipelines). In at least one embodiment, each instantiated session may monitor a single pipeline. In at least one embodiment, a single instantiated session may monitor more than one pipeline. The user may be allowed to specify, for a monitoring session, data inputs into the pipeline(s), view information related to the registered pipelines, copy information from one session to another, and so on. When various sub-tasks of the registered pipeline(s) are executed, metric collection engine 124 receives performance data and provides it to distributed pipeline monitor 120, which causes the performance data to be displayed on GUI 403, which may be rendered by a web browser in a browser window or presented by a local application (e.g., a mobile application such as a smartphone or tablet application).

GUI 403 (e.g., a browser-supported GUI, a mobile application GUI, a desktop application GUI, or some other GUI) may present several hierarchical functions, such as selecting a specific pipeline/task 404, selecting one or more sub-tasks 406 (for a given task), selecting one or more modules 408 (for a given sub-task), and so on. For each of the selected processes (tasks/sub-tasks/modules), pipeline monitoring application 162 may provide various performance metrics 410 indicating how the selected processes are progressing. Processing of user selections may be enabled by respective functions of distributed pipeline monitor 120, which may include system monitoring (system-level monitoring), 420, task monitoring (task-level monitoring) 430, and sub-task monitoring 440 (shown for a single task monitoring 430-2, for conciseness), which may further include module monitoring (module-level monitoring) 450. Modules 408 may be CPU modules, GPU kernels, or other software components (e.g., processes of the operation system) that manage specific hardware resources, such as CPUs, GPUs, memory devices, peripheral devices, etc. Sub-tasks may be executed using multiple modules. In at least one embodiment, sub-tasks may be deployed in a container that packages a code and code's dependencies, such as libraries, settings, etc., and that can be transferred from one computing environment to another for execution.

In at least one embodiment, performance metrics 410 may be displayed via timeline visualization graphs generated based on monitoring data received for various tasks, sub-tasks, modules, etc. For example, a graph may demonstrate CPU or GPU activity during execution of a particular sub-task. In some instances, where the graph has a substantial length and/or duration, distributed profile monitor 120 (or pipeline monitoring application 162) may extract relevant parts of the graph timeline suitable for real-time display on GUI 403.

System monitoring 420 may include receiving, e.g., from metric collection engine 124, a number of metrics related to performance of the distributed computing system. Such metrics may include (but need not be limited to): average memory activity (read/write), average CPU activity for all tasks, average CPU activity per task being executed, average GPU activity (including activity per task), which may include both GPU core and GPU memory activity, average task creation time and average task execution time, a number of executed tasks within a unit of time (e.g., per second, minute, hour, etc.), a number of GPU/memory operations per unit of time, a workflow orchestration engine 154 statistics, and so on. Such a system-level statistics indicates resource utilization and provides real time tracking of computational bottlenecks for a given (e.g., current) distribution of tasks among various distributed computing resources 330. The system-level information indicates to the user (e.g., pipeline developer or administrator) how to modify or redesign the current distribution of tasks to optimize utilization of computing resources.

Task monitoring 430 may include distributed pipeline monitor 120 interacting with metric collection engine 124 and workflow orchestration engine 154 and receiving (and displaying) a number of (task-level) performance metrics 410, including (but not limited to):

Lead Time that elapses between scheduling a task is provided, e.g., by application 310, for execution (e.g., to workflow orchestration engine 152) and the time when results (output) of execution become available (to application 310);

Cycle Time that elapses between the time workflow orchestration engine 154 schedules a task for execution (e.g., suing one or more distributed computing resources 330) and the time when the execution ends;

I/O Size of data provided as input to the task and received from the pipeline as an output of the task;

Peak Resource Usage characterizing peak (maximum) usage by the task of memory, GPU memory, CPU and/or GPU operations, other processor operations, bandwidth, throughput, latency, packet loss, and so on;

Mean Resource Usage characterizing mean usage by the task of memory, GPU memory, CPU operations, GPU operations, bandwidth, throughput, latency, packet loss, and so on;

Resource IDs of various hardware resources (GPUs, CPUs, other processors, memory devices, etc.) used during execution of the task.

In at least one embodiment, distributed pipeline monitor 120 may track job execution in real-time, by requesting and receiving information about scheduled and executed tasks from workflow orchestration engine 154 and having pipeline monitoring application 162 provide the received information for display in GUI 403. The displayed information may include real-time success/failure status of the task. Additionally, real-time status for various sub-tasks of the task may be similarly provided. Such real-time monitoring may further include providing (e.g., on GUI 403) a task-specific patch illustrating duration of time when the task is (or was) actively using CPUs/GPUs or other processors.

Sub-task monitoring 440 may include distributed pipeline monitor 120 interacting with metric collection engine 124 and workflow orchestration engine 154 and receiving (and displaying) a number of (sub-task-level) performance metrics 410, including (but not limited to):

Lead Time that elapses between scheduling a sub-task is provided, e.g., by application 310, for execution (e.g., to workflow orchestration engine 152) and the time when results (output) of execution of the sub-task become available (to application 310);

Cycle Time that elapses between the time workflow orchestration engine 154 schedules a sub-task for execution (e.g., suing one or more distributed computing resources 330) and the time when the execution ends;

I/O Size of data provided as input to the sub-task and received from the pipeline as an output of the sub-task;

Peak Resource Usage characterizing peak (maximum) usage by the sub-task of memory, GPU memory, CPU and/or GPU operations, other processor operations, bandwidth, throughput, latency, packet loss, and so on;

Mean Resource Usage characterizing mean usage by the sub-task of memory, GPU memory, CPU and/or GPU operations, other processor operations, bandwidth, throughput, latency, packet loss, and so on;

Resource IDs of various hardware resources (GPUs, CPUs, other processors, memory devices, etc.) used during execution of the sub-task;

Resource Usage (CPU/GPU/processor/memory/etc.) for various modules and submodules of the task, in instances where the task has additional module and sub-module components;

Real-Time Metrics (CPU/GPU/processor/memory/etc.) while sub-task operations are ongoing.

Additionally, distributed pipeline monitor 120 may provide a functionality to determine performance metrics associated with a specific sub-task when the sub-task is executed separately, and not as part of the broader task.

For example, a user (e.g., a developer) may flag or otherwise select a particular sub-task (e.g., by setting a separation flag or any other parameter) in distributed pipeline monitor 120 (e.g., using GUI 403) for independent execution. The flagged or selected sub-task may then be executed outside workflow orchestration engine 154. In one non-limiting example, workflow orchestration engine 154 may still handle the remaining sub-tasks of the computational pipeline whereas the user may assume control of the selected sub-task. In particular, the user may specify one or more hardware resources to be used in execution of the selected sub-task, e.g., CPUs, GPUs, memory devices, network channels and network controllers, and the like. During the selected sub-task execution, distributed pipeline monitor 120 may collect various performance metrics similarly to how performance metrics are collected for other sub-tasks that are configured by workflow orchestration engine 154. Collected metrics may be displayed on GUI 403. In some implementations, collected performance metrics for the selected sub-task may be displayed together with the performance metric for the same sub-task when the sub-task's execution is configured by workflow orchestration engine 154 (e.g., based on data collected during instances of the sub-task execution that took place prior to flagging). In some implementations, the two sets of metrics (for execution with and without workflow orchestration engine 154) may be provided for comparison in a graphical (or some other visual) form. Using such comparisons, the user may be able to ascertain possible inefficiencies in how workflow orchestration engine 154 schedules execution of various tasks and sub-task. The user may be able to choose various options (different hardware resources) for the sub-task execution and efficiently identify those options that maximize sub-task execution performance. Although in this example a single sub-task is flagged for independent monitoring, any number of sub-tasks of any distributed pipeline may be selected and analyzed in a similar manner.

Module monitoring 440-1 ... 440-4 may include providing performance metrics 410 for one or more modules that may be involved in execution of a distributed pipeline. In at least one embodiment, a single sub-task may utilize multiple modules, some of which may be executed by different physical computing devices. Module monitoring may involve a distributed pipeline monitor 120 obtaining an displaying (on GIU 403) a number of (module-level) performance metrics 410, including (but not limited to) information about:

Load/Store instructions that trigger respective memory requests to various memory devices, such as global, local, shared, etc., including atomic operations, register spills, and the like;

Texture fetch and global memory loads via Read-Only Data Cache function;

Control Flow instructions, such as all issued instructions that can have an effect on branch instructions, loop control instructions, return instructions, program termination, barrier synchronization, and the like.

Arithmetic instructions, such as floating point instruction, integer instructions, conversion operations, movement instructions, and the like;

Module launch statistics describing launch configurations, which may include a size of the module grid, division of the module grid into blocks, CPU/GPU/other processor resources for module execution, and other information that facilitates maximizing hardware resources utilization during sub-task execution;

Memory workload analysis of used and available memory, e.g., GPU memory, to facilitate maximizing overall module performance when various hardware units are fully (or almost fully) occupied, when available communication bandwidth of inter-unit connections is exhausted (or almost exhausted), or when maximum throughput of issued memory instructions is achieved (or almost achieved);

Occupancy, such as the ratio of the number of active GPU threads or groups of threads (thread warps) per processor (such as a streaming multiprocessor) to the maximum number of possible active threads (or thread warps), to facilitate preventing low occupancy situations (low occupancy may reduce an ability to hide latencies and result in an overall performance degradation) and with identifying large discrepancies between theoretical and achieved occupancies (indicative of unbalanced loads);

Speed-of-Light reports, which may indicate achieved (for each kernel) percentage of utilization of computational (e.g., CPU/GPU/etc.) and memory resources relative to a theoretical maximum.

Figure 5:
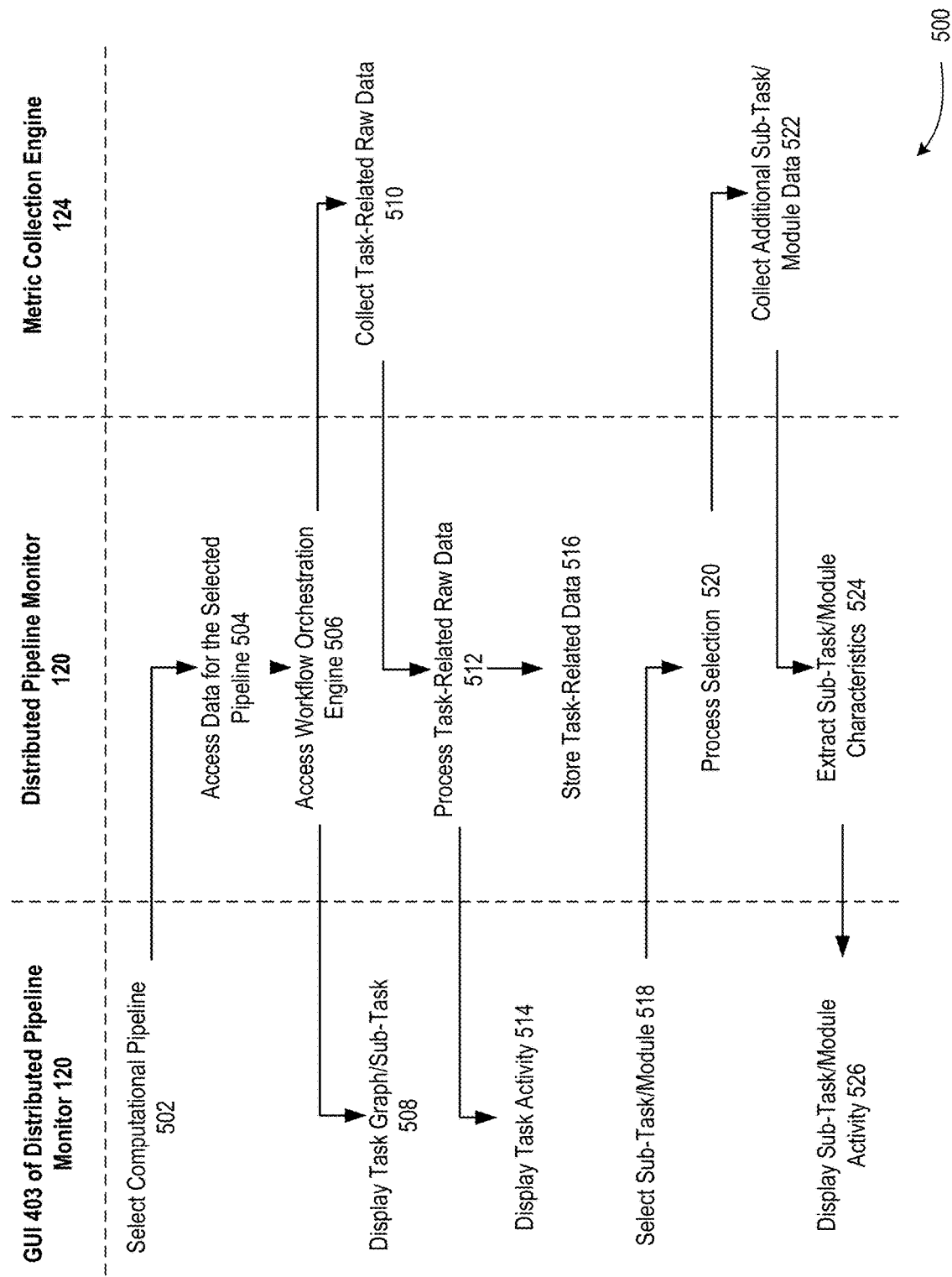
FIG. 5 is an example workflow of pipeline monitoring of a system that provides distributed computing resources for task execution, according to at least one embodiment.

FIG. 5 is an example workflow 500 of pipeline monitoring of a system that provides distributed computing resources for task execution, according to at least one embodiment. Shown are actions taken at GUI 403 of distributed pipeline monitor 120 (e.g., browser-provided GUI, mobile application GUI, or any other GUI), such as receiving user selections and displaying data. Also shown are actions taken by distributed pipeline monitor 120, such as processing performance data, and actions taken by metric collection 124 engine, such as collecting data. At operation 502, GUI 403 of pipeline monitoring application 162 may detect that a user requested to register or otherwise made a selection of a computational pipeline. (For conciseness, operations of FIG. 5 are referenced with respect to a single pipeline, but any number of pipelines can be processed in substantially similar fashion.) Pipeline monitoring application 162 may provide the selection of the pipeline to distributed pipeline monitor 120. At operation 504, distributed pipeline monitor 120 may access data associated with the selected pipeline and further access, at operation 506, workflow orchestration engine 154 to obtain information about the selected pipeline. Based on the accessed data and/or the obtained information, distributed pipeline monitor 120 may, at operation 508, provide for presentation on GUI 403 (e.g., via pipeline monitoring application 162) a graph (e.g., a DAG) of the selected pipeline or some other graphical or textual representation of the pipeline. The representation of the pipeline may include a picture (or listing, or some other depiction) of various nodes (sub-tasks) of the pipeline. In at least one embodiment, the representation of the pipeline may include distribution of sub-tasks among various computing devices, as assigned by workflow orchestration engine 152. The displayed pipeline representation may include selectable representations of the sub-tasks (e.g., as clickable icons of the pipeline nodes).

In addition to providing information about the selected pipeline for presentation on GUI 403, distributed pipeline monitor 120 may provide a request to metric collection engine 124 to collect, at operation 510, task-related data. Task-related data can be a raw data harvested in a format that is used by a hardware device assigned, by workflow orchestration engine 152, to execute a specific task (or in a number of different raw formats used by different computing devices). At operation 512, distributed pipeline monitor 120 may receive, from metric collection engine 124, the raw data collected by metric collection engine 124 and process, at operation 512, the collected task-related data. Task-related data may be processed, e.g., converted to one or more formats used by distributed pipeline monitor 120, filtered, normalized, analyzed using methods of statistical analysis, combined, plotted, and so on. At operation 514, the processed task-related data may be provided for display as task activity on GUI 403. Additionally, at operation 516, distributed pipeline monitor 120 may store task-related data. In at least one embodiment, the stored task-related data may be in a raw (unprocessed) format. In at least one embodiment, the task-related data may be stored in a processed format.

At operation 518, distributed pipeline monitor 120 may receive (e.g., from pipeline monitoring application 162) a selection (e.g., a user selection) of a computational sub-task (e.g., of the pipeline selected previously at operation 502) or a module of a sub-task, for a more detailed activity reporting. At process step 520, distributed pipeline monitor 120 may process the sub-task/module request and send a request to metric collection engine 124 to collect additional sub-task and/or module data. In some instances, multiple sub-tasks/modules may be selected and processed. At process step 522, metric collection engine 124 may collect data about selected sub-task(s) and/or module(s) and provide the collected data to distributed pipeline monitor. At processed 524, distributed pipeline monitor 120 may extract sub-task-level and/or module-level characteristics from the provided data. Additionally, the provided data may be processed, converted into one or more formats used by distributed pipeline monitor 120, filtered, normalized, analyzed using methods of statistical analysis, combined, plotted, and so on. At processed 526, the extracted characteristics may be provided for display as sub-task/module activity on GUI 403. Some or all blocks 502-526 may be repeated when the user makes a selection of a different sub-task/module of an already selected pipeline or when the user makes a selection of a different pipeline.

Figure 6:
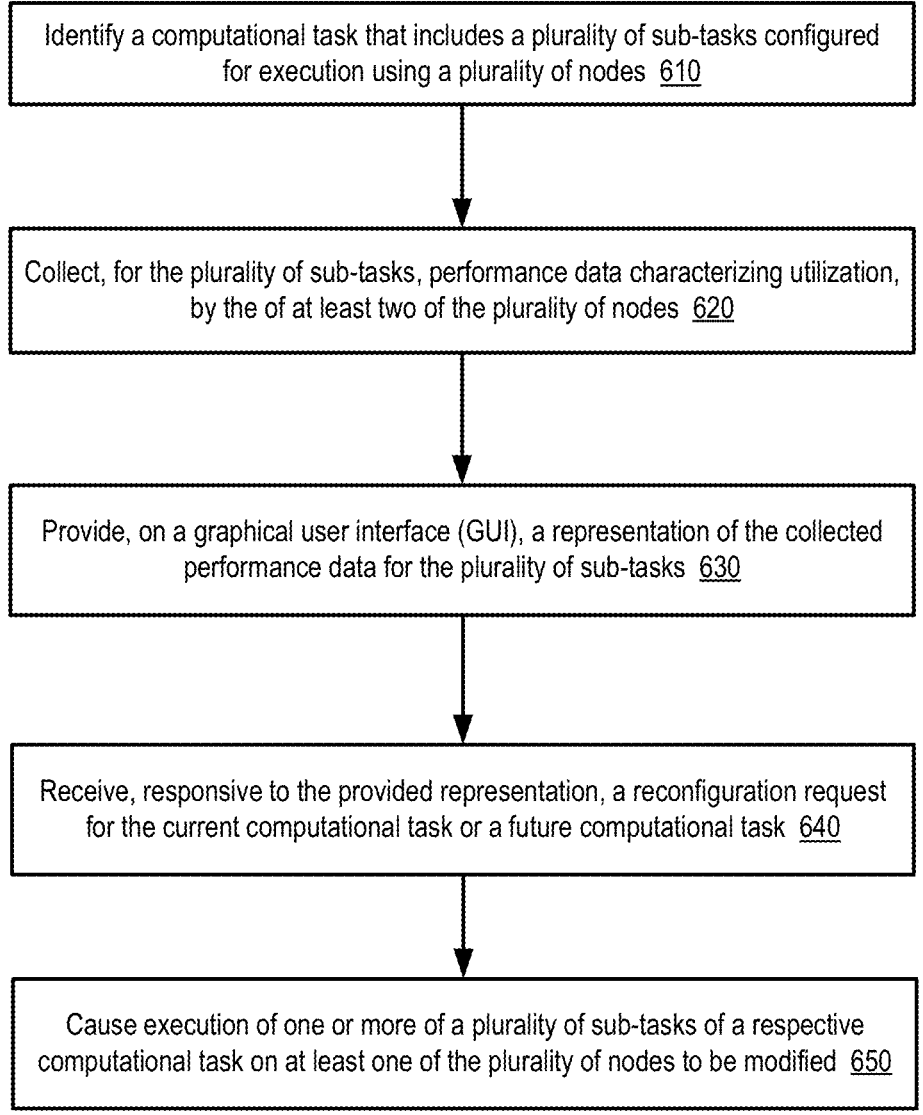
FIG. 6 is a flow diagram of example method of pipeline monitoring of distributed computing resources, according to at least one embodiment.

FIG. 6 is a flow diagram of example method 600 of pipeline monitoring of distributed computing resources, according to at least one embodiment. In at least one embodiment, pipeline monitoring of distributed computing resources may be performed in the context of an application (e.g., domain specific application 310) being executed using the distributed computing resources. In at least one embodiment, method 600 may be performed by one or more processing units (e.g., CPUs and/or GPUs) of metric collection server 101, one or more computing devices 102, workflow server 150, or some other computing machine. In at least one embodiment, method 600 of FIG. 6 may be performed by a computing device 103 depicted in FIG. 1B, which may include one or more CPUs 130, GPUs 110, and one or more memory devices, such as registers 113, shared registers 114, cache 118, GPU memory 119, and so on. In at least one embodiment, method 600 may be performed by multiple processing threads (e.g., CPU or GPU threads), each thread executing one or more individual functions, routines, subroutines, or operations of the method. In at least one embodiment, processing threads implementing method 600 may be synchronized (e.g., using semaphores, critical sections, and/or other thread synchronization mechanisms). Alternatively, processing threads implementing method 600 may be executed asynchronously with respect to each other. Various operations of method 600 may be performed in a different order compared with the order shown in FIG. 6. Some operations of the methods may be performed concurrently with other operations. In at least one embodiment, one or more operations shown in FIG. 6 may not always be performed.

In at least one embodiment, at block 610, one or more processing units performing method 600 may identify a first computational task that may include a plurality of sub-tasks. The first computational task may be configured for execution on a plurality of nodes, each of the plurality of nodes executing at least one of the plurality of sub-tasks. In at least one embodiment, configuring execution of the first computational task on the plurality of computational nodes may be performed by a workflow orchestration engine. In at least one embodiment, one or more of the plurality of nodes may each include one or more GPUs executing at least a portion of a sub-task assigned to a respective node. A sequence of the plurality of sub-tasks may be represented using a directional acyclic graph. The graph may have a plurality of vertices, each of the plurality of sub-tasks corresponding to a respective vertex of the plurality of vertices. In at least one embodiment, the first computational task may be one of a plurality of computational tasks being concurrently executed on the plurality of nodes.

At block 620, method 600 may continue with one or more processing units collecting performance data for the plurality of sub-tasks of the first computational task. The performance data may be collected while the first computational task is being executed. The collected performance data may characterize utilization, by each of the plurality of sub-tasks, of various resources of the nodes involved in execution of the sub-tasks. In at least one embodiment, resources may include hardware and software resources of various nodes. In at least one embodiment, where multiple computational tasks are being monitored concurrently, performance data may be collected for each computational task. In at least one embodiment, the collected performance data may include, for one or more of the plurality of nodes, performance data characterizing execution of the task(s) at sub-task level. In at least one embodiment, the collected performance data may further include performance data characterizing execution of the task(s) at module level.

At block 630, one or more processing units performing method 600 may provide, for presentation on the GUI, a representation of the collected performance data for the plurality of sub-tasks. The representation of the collected performance data may include a representation of the DAG, e.g., a graphic representation, a textual representation, a menu-based representation, a clickable representation, and the like. In at least one embodiment, where multiple computational tasks are being monitored concurrently, representations (e.g., DAGs) of the collected performance data may be provided for each of the monitored computational tasks. In at least one embodiment, the representation of the DAG(s) may be obtained from the workflow orchestration engine. In at least one embodiment, obtaining the representation of the DAG(s) may include using an API between the workflow orchestration engine and an application component (e.g., distributed pipeline monitor 120) that collects the performance data. In at least one embodiment, the GUI may be displayed by an application (e.g., a web browser, a desktop application, a mobile application, etc.) instantiated on a remote computing device. In at least one embodiment, prior to providing the representation of the collected performance data, the computing device that collects performance data may provide the API package to the remote computing device. The provided API package may be used to install pipeline monitoring API on the remote computing device, to facilitate real-time rendering of the performance data and to enable a user of the remote computing device to have access to the collected performance data.

The provided representations of the performance data may be viewed by a user. The information contained in the provided representation may indicate how to optimize the execution of one of the computational tasks being monitored. For example, the user may determine that some of the nodes have excessive computational loads and/or data loads while other nodes may be underutilized. Consequently, at block 640, one or more processing units performing method 600 may continue with one or more processing units receiving a reconfiguration request (e.g., based on user input in response to the provided representation). The reconfiguration request may pertain to execution of one of the computational tasks that are currently being executed. As a result, execution of some of the sub-tasks may be moved to different nodes, execution of some of the sub-tasks may be split between multiple nodes, whereas execution of some of the sub-tasks may be shifted to different processing devices (e.g., from GPUs to CPUs and vice versa) within the same node, and so on. In at least one embodiment, the reconfiguration request may pertain to a subsequent (e.g., future) execution on the plurality of nodes of one of the computational pipelines that are currently being executed.

At block 650, method 600 may continue with one or more processing units causing, responsive to the reconfiguration request, execution of one or more of a plurality of (current or future) sub-tasks identified in the reconfiguration request on at least one of the of nodes to be modified. For example, the reconfiguration request may be provided to the workflow orchestration engine and the workflow orchestration engine may implement the requested modifications.

Inference and Training Logic

Figure 7A:
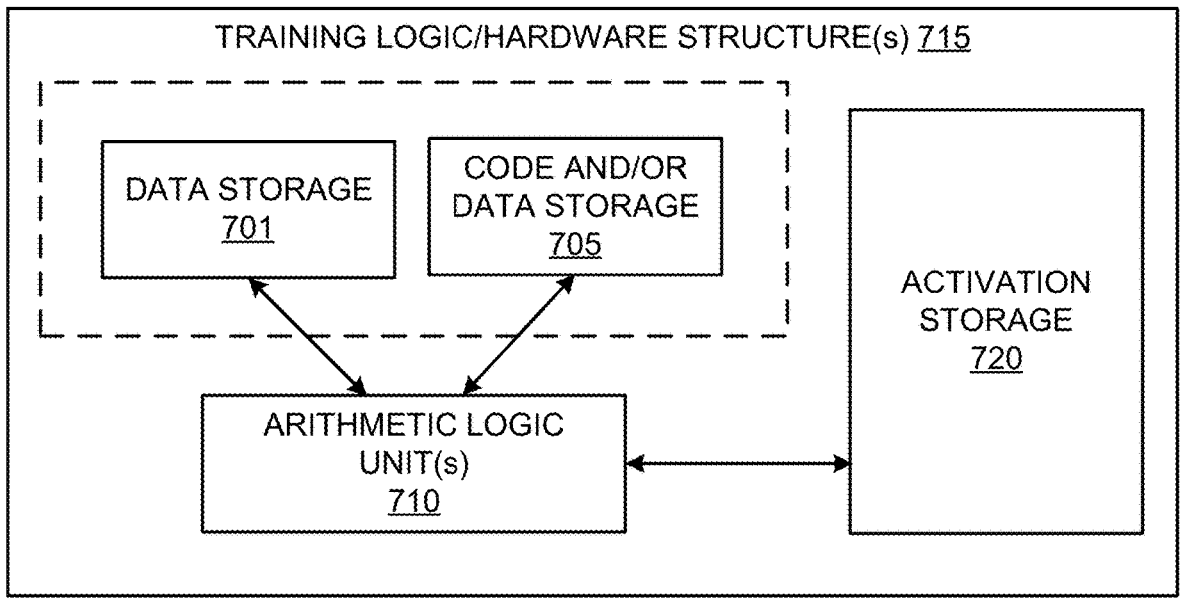
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
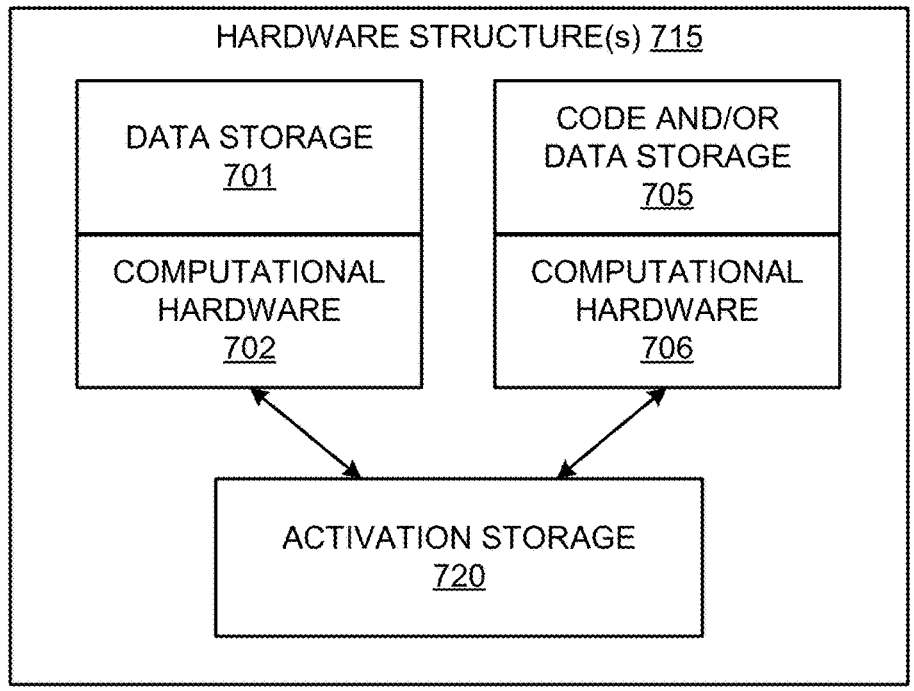
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
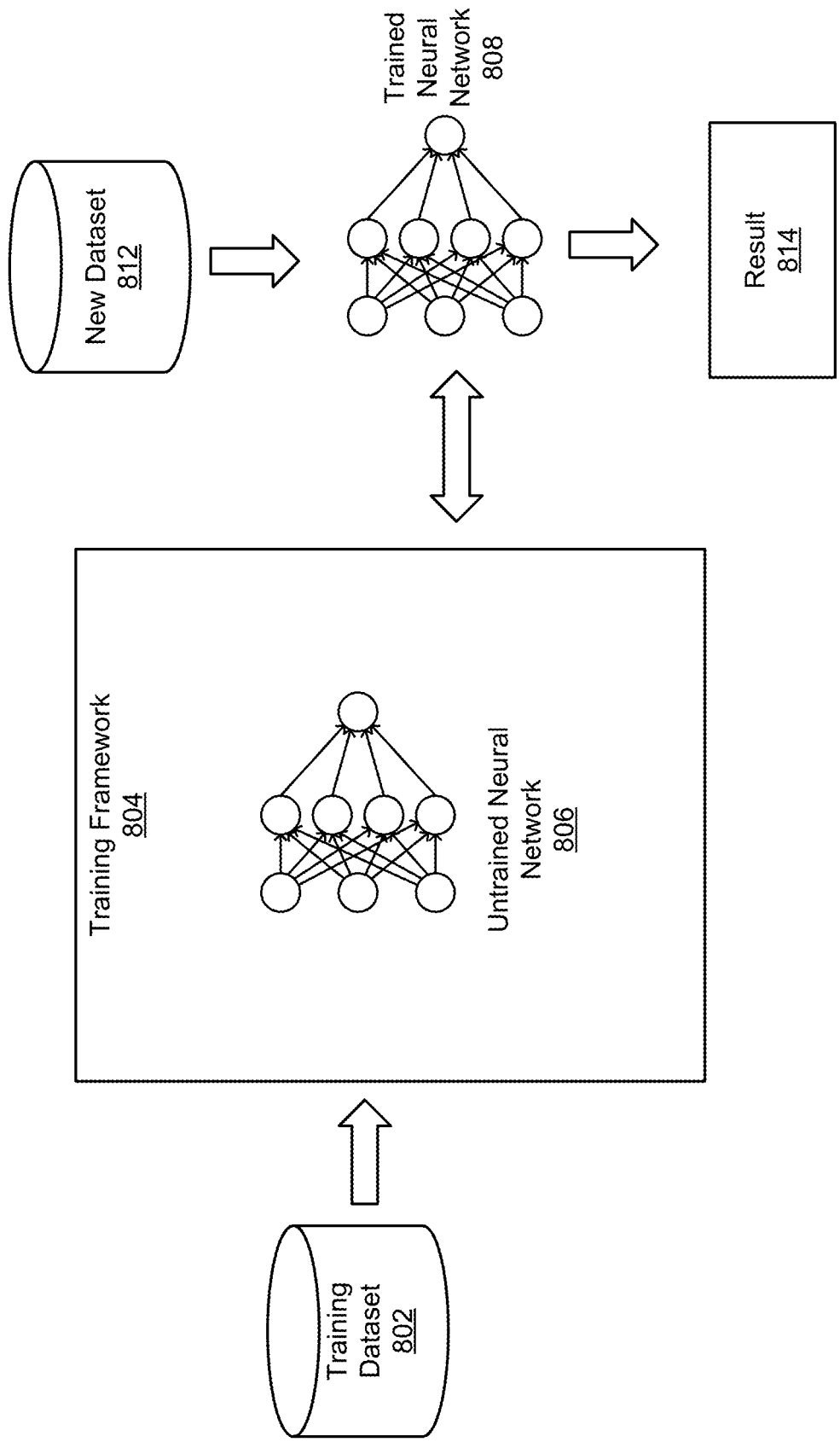
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
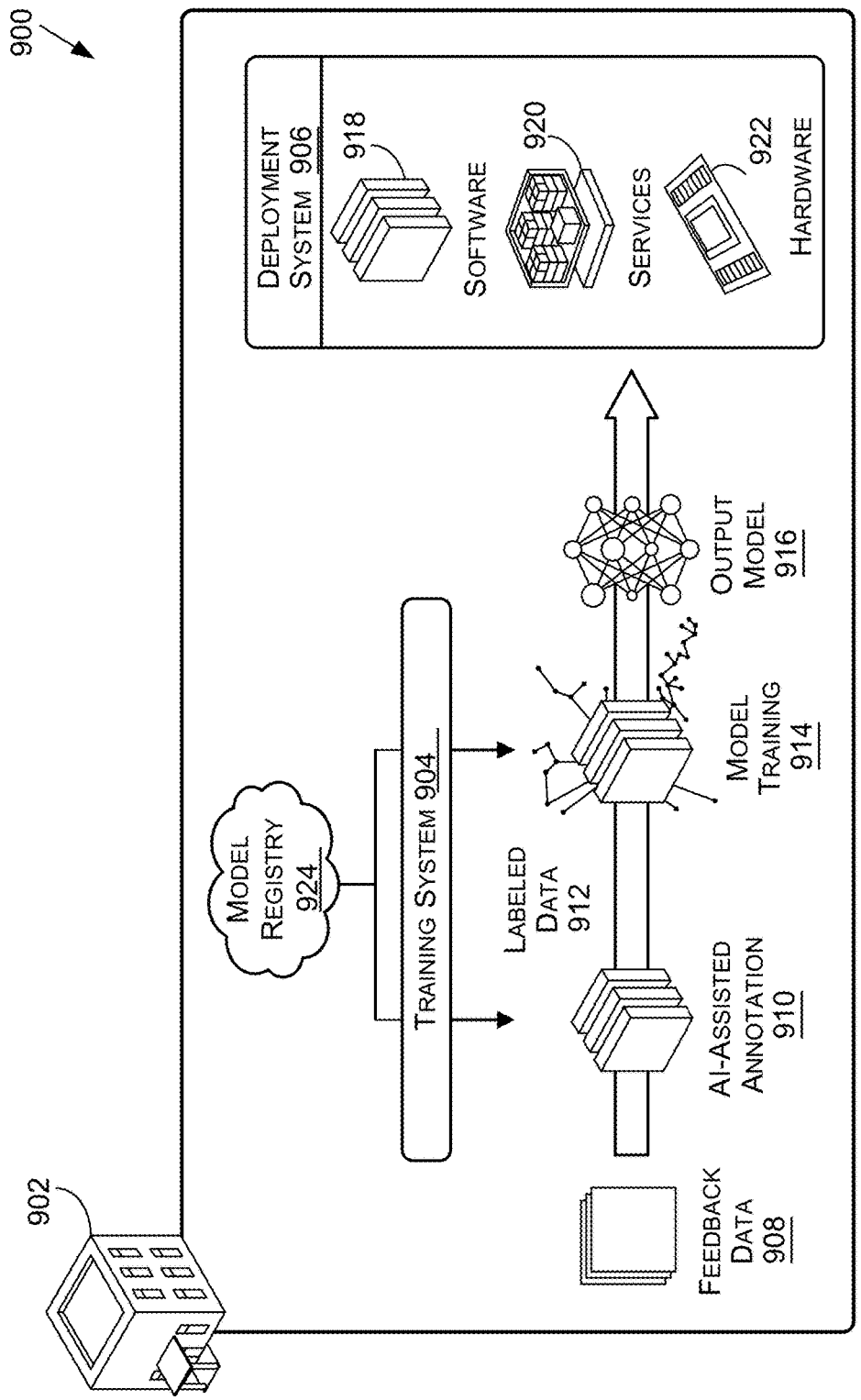
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations

910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
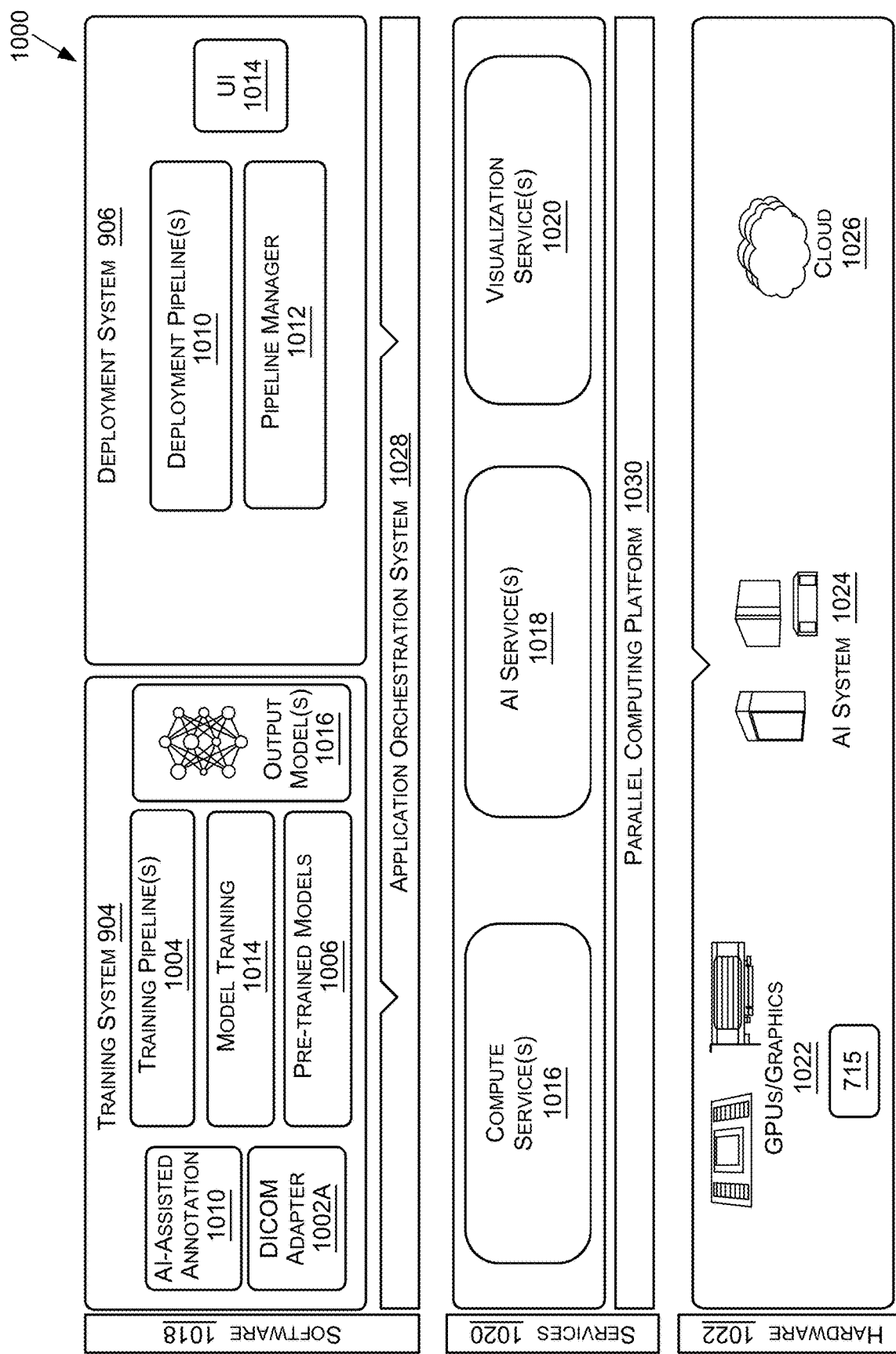
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types)—including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, user interface 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged by and shared by applications or containers in deployment system 906 may include compute services 1016, AI services 1018, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services 1016, AI services 1018, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models).

In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Data Center

Figure 11:
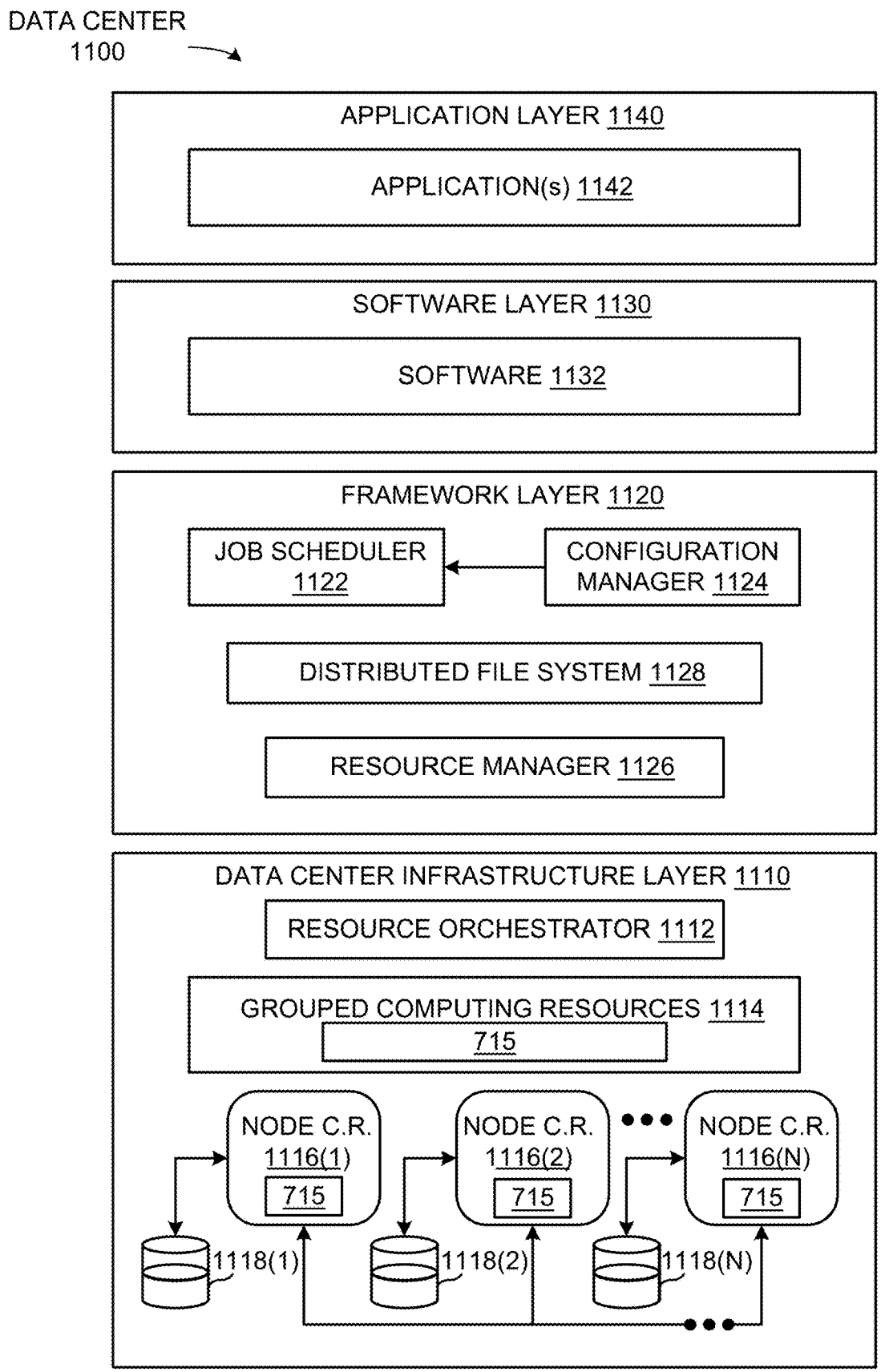
FIG. 11 illustrates an example data center system, according to at least one embodiment.

FIG. 11 illustrates an example data center 1100, in which at least one embodiment may be used. In at least one embodiment, data center 1100 includes a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents a positive integer (which may be a different integer "N" than used in other figures). In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory storage devices 1118(1)-1118(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). In at least one embodiment, separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator 1112 may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resources 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. In at least one embodiment, one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1128 of framework layer 1120. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided herein in conjunction with FIGS.

7A and/or 7B. In at least one embodiment, inference and/or training logic 715 may be used in system FIG. 11 for inferencing or predicting operations based, at least in part, on weight parameters calculated using neural network training operations, neural network functions and/or architectures, or neural network use cases described herein.

At least one embodiment of the disclosure can be described in view of the following clauses:

In clause 1, a method comprising: identifying a first computational task that comprises a plurality of sub-tasks configured for execution using a plurality of nodes, wherein at least two nodes of the plurality of nodes is executing at least one of the plurality of sub-tasks; collecting, during execution of the first computational task, performance data for the plurality of sub-tasks, the collected performance data characterizing utilization, by the plurality of sub-tasks, of resources of the at least two nodes of the plurality of nodes; providing, for presentation on a graphical user interface (GUI), a representation of the collected performance data for the plurality of sub-tasks; receiving, responsive to the provided representation, a reconfiguration request pertaining to execution corresponding to at least one of: the first computational task being currently executed on the plurality of nodes, or a second computational task to be subsequently executed on the plurality of nodes; and responsive to the reconfiguration request, causing execution of one or more of a plurality of sub-tasks of a respective computational task on at least one of the plurality of nodes to be modified.

In clause 2, the method of clause 1, wherein a sequence of the plurality of sub-tasks is representable by a directional acyclic graph (DAG) having a plurality of vertices, wherein each of the plurality of sub-tasks corresponds to a respective vertex of the plurality of vertices, and wherein the representation of the collected performance data comprises a representation of the DAG.

In clause 3, the method of clause 2, wherein configuring execution of the first computational task on the plurality of computational nodes is performed by a workflow orchestration engine (WOE), the method further comprising: obtaining the representation of the DAG using the WOE.

In clause 4, the method of clause 3, wherein obtaining the representation of the DAG comprises using an application programming interface (API) between the WOE and an application component that collects the performance data.

In clause 5, the method of clause 1, wherein the performance data comprises, for at least one node of the plurality of nodes, a sub-task-level performance data and a module-level performance data.

In clause 6, the method of clause 1, wherein each of at least one node of the plurality of nodes comprises one or more graphics processing units (GPU), the one or more GPU executing at least a portion of a sub-task assigned to a respective node.

In clause 7, the method of clause 1, wherein the GUI is hosted using a first computing device that is different from a second computing device being used to host a component collecting the performance data, and wherein providing the representation of the collected performance data comprises using an API facilitating real-time rendering of the performance data.

In clause 8, the method of clause 7, wherein the GUI is presented using at least one of a web browser or a mobile application.

In clause 9, the method of clause 7, wherein the first computing device is remote to the second computing device, and wherein, prior to providing the representation of the collected performance data, the second computing device provides the API to the first computing device.

In clause 10, the method of clause 1, further comprising: configuring execution of a plurality of computational tasks comprising the first computational task; collecting performance data for each of the plurality of computational tasks; and providing, via the GUI, access to the representation of the collected performance data for each of the plurality of computational tasks.

In clause 11, a system comprising: a memory device; and one or more processing devices, communicatively coupled to the memory device, to: identify a first computational task that comprises a plurality of sub-tasks configured for execution using a plurality of nodes, wherein at least two nodes of the plurality of nodes is executing at least one of the plurality of sub-tasks; collect, during execution of the first computational task, performance data for the plurality of sub-tasks, the collected performance data characterizing utilization, by the plurality of sub-tasks, of resources of the at least two nodes of the plurality of nodes; provide, for presentation on a graphical user interface (GUI), a representation of the collected performance data for the plurality of sub-tasks; receive, responsive to the provided representation, a reconfiguration request pertaining to execution corresponding to at least one of: the first computational task being currently executed on the plurality of nodes, or a second computational task to be subsequently executed on the plurality of nodes; and responsive to the reconfiguration request, cause execution of one or more of a plurality of sub-tasks of a respective computational task on at least one of the plurality of nodes to be modified.

In clause 12, the system of clause 11, wherein the performance data comprises, for at least one node of the plurality of nodes, a sub-task-level performance data and a module-level performance data.

In clause 13, the system of clause 11, wherein each of at least one node of the plurality of nodes comprises one or more graphics processing units (GPU), the one or more GPU executing at least a portion of a sub-task assigned to a respective node.

In clause 14, the system of clause 11, wherein the GUI is hosted using a first computing device that is different from a second computing device being used to host a component collecting the performance data, and wherein providing the representation of the collected performance data comprises using an application programming interface facilitating real-time rendering of the performance data.

In clause 15, the system of clause 14, wherein the GUI is presented using a web browser or a mobile application.

In clause 16, the system of clause 15, wherein the first computing device is remote to the second computing device, and wherein, prior to providing the representation of the collected performance data, the second computing device provides the API to the first computing device.

In clause 17, a non-transitory computer-readable medium storing instructions thereon, wherein the instructions, when executed by a processing device, cause the processing device to: identifying a first computational task that comprises a plurality of sub-tasks configured for execution using a plurality of nodes, wherein at least two nodes of the plurality of nodes is executing at least one of the plurality of sub-tasks; collect, during execution of the first computational task, performance data for the plurality of sub-tasks, the collected performance data characterizing utilization, by the plurality of sub-tasks, of resources of the at least two nodes of the plurality of nodes; provide, for presentation on a graphical user interface (GUI), a representation of the collected performance data for the plurality of sub-tasks; receive, responsive to the provided representation, a reconfiguration request pertaining to execution corresponding to at least one of: the first computational task being currently executed on the plurality of nodes, or a second computational task to be subsequently executed on the plurality of nodes; and responsive to the reconfiguration request, cause execution of one or more of a plurality of sub-tasks of a respective computational task on at least one of the plurality of nodes to be modified.

In clause 18, the non-transitory computer-readable medium of clause 17, wherein the performance data comprises, for at least one node of the plurality of nodes, a sub-task-level performance data and a module-level performance data.

In clause 19, the non-transitory computer-readable medium of clause 17, wherein each of at least one node of the plurality of nodes comprises one or more graphics processing units (GPU), the one or more GPU executing at least a portion of a sub-task assigned to a respective node.

In clause 20, the non-transitory computer-readable medium of clause 17, wherein the GUI is hosted using a first computing device that is different from a second computing device being used to host a component collecting the performance data, and wherein providing the representation of the collected performance data comprises using an application programming interface facilitating real-time rendering of the performance data.

In clause 21, the non-transitory computer-readable medium of clause 20, wherein the GUI is presented by a web browser or a mobile application.

In clause 22, the non-transitory computer-readable medium of clause 20, wherein the first computing device is remote to the second computing device, and wherein, prior to providing the representation of the collected performance data, the second computing device provides the API to the first computing device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    identifying a first computational task that comprises a plurality of sub-tasks configured for execution using a plurality of nodes, wherein at least two nodes of the plurality of nodes are executing at least one of the plurality of sub-tasks;
    collecting, during execution of the first computational task, real-time performance data for the plurality of sub-tasks, the collected performance data characterizing utilization, by the plurality of sub-tasks, of resources of the at least two nodes of the plurality of nodes, wherein the collected real-time performance data comprises data of multiple formats;
    converting the data of multiple formats into a uniform format to obtain a representation of the collected real-time performance data for the plurality of sub-tasks and for the at least two nodes of the plurality of nodes;
    streaming, for presentation on a graphical user interface (GUI), the representation of the collected real-time performance data;
    receiving, responsive to the streamed representation, a reconfiguration request to modify execution on at least one node of the plurality of nodes, of at least one of:
        the first computational task being currently executed on the plurality of nodes, or
        a second computational task to be subsequently executed on the plurality of nodes;
    wherein the reconfiguration request is received while the first computational task is being executed; and
        responsive to the reconfiguration request, causing execution of one or more of a plurality of sub-tasks of a respective computational task on at least one of the plurality of nodes to be modified.

2. The method of claim 1, wherein a sequence of the plurality of sub-tasks is representable by a directional acyclic graph (DAG) having a plurality of vertices, wherein each of the plurality of sub-tasks corresponds to a respective vertex of the plurality of vertices, and wherein the representation of the collected performance data comprises a representation of the DAG.

3. The method of claim 1, wherein the plurality of sub-tasks is configured by a workflow orchestration engine (WOE), wherein the reconfiguration request is received responsive to:
receiving, responsive to the streamed representation, (i) an instruction to execute, outside the WOE, one or more selected sub-tasks of the plurality of sub-tasks, and (ii) a new configuration for the one or more selected sub-tasks;
causing execution of the one or more selected sub-tasks to be modified according to the new configuration;
collecting additional real-time performance data for the modified execution of the one or more selected sub-tasks; and
updating the streamed representation of the collected performance data using the additional real-time performance data.

4. The method of claim 3, wherein obtaining the representation of the DAG comprises using an application programming interface (API) between the WOE and an application component that collects the performance data.

5. The method of claim 1, wherein the performance data comprises, for at least one node of the plurality of nodes, a sub-task-level performance data and a module-level performance data.

6. The method of claim 1, wherein each of at least one node of the plurality of nodes comprises one or more graphics processing units (GPU), the one or more GPU executing at least a portion of a sub-task assigned to a respective node.

7. The method of claim 1, wherein the GUI is hosted using a first computing device that is different from a second computing device being used to host a component collecting the performance data, and wherein providing the representation of the collected performance data comprises using an API facilitating real-time rendering of the performance data.

8. The method of claim 7, wherein the GUI is presented using at least one of a web browser or a mobile application.

9. The method of claim 7, wherein the first computing device is remote to the second computing device, and wherein, prior to providing the representation of the collected performance data, the second computing device provides the API to the first computing device.

10. The method of claim 1, further comprising:
configuring execution of a plurality of computational tasks comprising the first computational task;
collecting performance data for each of the plurality of computational tasks; and
providing, via the GUI, access to the representation of the collected performance data for each of the plurality of computational tasks.

11. A system comprising:
a memory device; and
one or more processing devices, communicatively coupled to the memory device, to:
identify a first computational task that comprises a plurality of sub-tasks configured for execution using a plurality of nodes, wherein at least two nodes of the plurality of nodes are executing at least one of the plurality of sub-tasks;
collect, during execution of the first computational task, real-time performance data for the plurality of sub-tasks, the collected performance data characterizing utilization, by the plurality of sub-tasks, of resources of the at least two nodes of the plurality of nodes, wherein the collected real-time performance data comprises data of multiple formats;
convert the data of multiple formats into a uniform format to obtain a representation of the collected real-time performance data for the plurality of sub-tasks and for the at least two nodes of the plurality of nodes;
stream, for presentation on a graphical user interface (GUI), the representation of the collected real-time performance data;
receive, responsive to the streamed representation, a reconfiguration request to modify execution on at least one node of the plurality of nodes, of at least one of:
the first computational task being currently executed on the plurality of nodes, or
a second computational task to be subsequently executed on the plurality of nodes;
wherein the reconfiguration request is received while the first computational task is being executed; and
responsive to the reconfiguration request, cause execution of one or more of a plurality of sub-tasks of a respective computational task on at least one of the plurality of nodes to be modified.

12. The system of claim 11, wherein the performance data comprises, for at least one node of the plurality of nodes, a sub-task-level performance data and a module-level performance data.

13. The system of claim 11, wherein each of at least one node of the plurality of nodes comprises one or more graphics processing units (GPU), the one or more GPU executing at least a portion of a sub-task assigned to a respective node.

14. The system of claim 11, wherein the GUI is hosted using a first computing device that is different from a second computing device being used to host a component collecting the performance data, and wherein providing the representation of the collected performance data comprises using an application programming interface facilitating real-time rendering of the performance data.

15. The system of claim 14, wherein the GUI is presented using a web browser or a mobile application.

16. The system of claim 15, wherein the first computing device is remote to the second computing device, and wherein, prior to providing the representation of the collected performance data, the second computing device provides the API to the first computing device.

17. A non-transitory computer-readable medium storing instructions thereon, wherein the instructions, when executed by a processing device, cause the processing device to:
identify a first computational task that comprises a plurality of sub-tasks configured for execution using a plurality of nodes, wherein at least two nodes of the plurality of nodes are executing at least one of the plurality of sub-tasks;
collect, during execution of the first computational task, real-time performance data for the plurality of sub-tasks, the collected performance data characterizing utilization, by the plurality of sub-tasks, of resources of the at least two nodes of the plurality of nodes, wherein the collected real-time performance data comprises data of multiple formats;

convert the data of multiple formats into a uniform format to obtain a representation of the collected real-time performance data for the plurality of sub-tasks and for the at least two nodes of the plurality of nodes;

stream, for presentation on a graphical user interface (GUI), the representation of the collected real-time performance data;

receive, responsive to the streamed representation, a reconfiguration request to modify execution on at least one node of the plurality of nodes, of at least one of:
  the first computational task being currently executed on the plurality of nodes, or
  a second computational task to be subsequently executed on the plurality of nodes;

wherein the reconfiguration request is received while the first computational task is being executed; and responsive to the reconfiguration request, cause execution of one or more of a plurality of sub-tasks of a respective computational task on at least one of the plurality of nodes to be modified.

18. The computer-readable medium of claim 17, wherein the performance data comprises, for at least one node of the plurality of nodes, a sub-task-level performance data and a module-level performance data.

19. The computer-readable medium of claim 17, wherein each of at least one node of the plurality of nodes comprises one or more graphics processing units (GPU), the one or more GPU executing at least a portion of a sub-task assigned to a respective node.

20. The computer-readable medium of claim 17, wherein the GUI is hosted using a first computing device that is different from a second computing device being used to host a component collecting the performance data, and wherein providing the representation of the collected performance data comprises using an application programming interface facilitating real-time rendering of the performance data.

21. The computer-readable medium of claim 20, wherein the GUI is presented by a web browser or a mobile application.

22. The computer-readable medium of claim 20, wherein the first computing device is remote to the second computing device, and wherein, prior to providing the representation of the collected performance data, the second computing device provides the API to the first computing device.

* * * * *